US011050999B1

(12) United States Patent
Chang et al.

(10) Patent No.: US 11,050,999 B1
(45) Date of Patent: Jun. 29, 2021

(54) DUAL CAMERA CALIBRATION

(71) Applicant: Black Sesame International Holding Limited, Santa Clara, CA (US)

(72) Inventors: Kuochin Chang, Cupertino, CA (US); Chao Wang, Shanghai (CN)

(73) Assignee: Black Sesame International Holding Limited, San Jose, CA (US)

(*) Notice: Subject to any disclaimer, the term of this patent is extended or adjusted under 35 U.S.C. 154(b) by 0 days.

(21) Appl. No.: 16/883,485

(22) Filed: May 26, 2020

(51) Int. Cl.
*H04N 13/246* (2018.01)
*H04N 13/243* (2018.01)
*G06T 7/80* (2017.01)

(52) U.S. Cl.
CPC ............ *H04N 13/246* (2018.05); *G06T 7/85* (2017.01); *H04N 13/243* (2018.05)

(58) Field of Classification Search
CPC ....... H04N 13/246; H04N 13/243; G06T 7/85
USPC ......................................................... 348/148
See application file for complete search history.

(56) References Cited

U.S. PATENT DOCUMENTS

| 10,609,360 | B2* | 3/2020 | Chang | H04N 13/246 |
| 2014/0043434 | A1* | 2/2014 | Asano | H04N 9/68 348/42 |
| 2016/0171675 | A1* | 6/2016 | Tseng | G06F 3/0383 345/8 |
| 2016/0316192 | A1* | 10/2016 | Kishiwada | H04N 13/239 |
| 2019/0026887 | A1* | 1/2019 | Marrion | G06T 7/85 |
| 2019/0387110 | A1* | 12/2019 | Chen | B29C 64/393 |

FOREIGN PATENT DOCUMENTS

WO   WO-2014181581  A1 * 11/2014  ............. G06T 7/85

* cited by examiner

*Primary Examiner* — Michael Lee
(74) *Attorney, Agent, or Firm* — Timothy T. Wang; Ni, Wang & Massand, PLLC (57) ABSTRACT

A method of calibration of a dual camera system, including, providing a chart of a plurality of circular rings and at least one disk, imaging the chart with a first camera to provide a first chart image and a second camera to provide a second chart image, performing edge detection of the first and second chart image on the plurality of circular rings and the at least one disk, determining the relative position of the plurality of circular rings to the at least one disk, matching the relative positions of the plurality of circular rings of the first chart image and the second chart image and aligning the first camera and the second camera based on the matching of the first chart image to the second chart image.

8 Claims, 9 Drawing Sheets

Fig. 9

DUAL CAMERA CALIBRATION

BACKGROUND

Technical Field

The instant disclosure is related to digital photography and more specifically to the calibration of a dual camera system.

Background

In general, imaging pictures on a pre-defined chart at a pre-define distance is the common setup of the calibration process. However, to calibrate a fixed focused camera, due to its far focus position, the pre-defined chart may be large in order to cover its full field of view and the chart may be at an extended length from the cameras. This setup may occupy a large space of production factory and the chart may be affected by gravity.

SUMMARY

In one embodiment a method of calibration of a dual camera system, including, providing a chart of a plurality of circular rings and at least one disk, imaging the chart with a first camera to provide a first chart image, imaging the chart with a second camera to provide a second chart image, performing edge detection of the first chart image and the second chart image on the plurality of circular rings and the at least one disk, wherein a plurality of inner edges and a plurality of outer edges are detected of the plurality of circular rings and an outer edge is detected of the at least one disk, determining the relative position of the plurality of circular rings to the at least one disk, matching the relative positions of the plurality of circular rings of the first chart image and the second chart image and aligning the first camera and the second camera based on the matching of the first chart image to the second chart image.

In another embodiment a method of calibration of a dual camera system, including, providing a chart of a plurality of circular rings and at least one disk, imaging the chart with a first camera to provide a first chart image, imaging the chart with a second camera to provide a second chart image, binarizing the first chart image and second chart image to remove gray scale components, performing edge detection of the first chart image and the second chart image on the plurality of circular rings and the at least one disk, wherein a plurality of inner edges and a plurality of outer edges are detected of the plurality of circular rings and an outer edge is detected of the at least one disk, fitting at least one center to the plurality of circular rings and the at least one disk, fitting at least one radius to the plurality of circular rings and the at least one disk, grouping the plurality of inner edges and the plurality of outer edges of the plurality of circular rings to the at least one center based on the at least one radius, indexing the at least one center of the plurality of circular rings utilizing the at least one disk as a reference based on the grouping, matching the indexed at least one center of the first chart image and the second chart image and aligning the first camera and the second camera based on the matching of the first chart image to the second chart image.

In yet a further embodiment, a method of calibration of a dual camera system, including, providing a chart of a plurality of discrete geometric outlines having at least one of the plurality of discrete geometric outlines filled in, imaging the chart with a first camera to provide a first chart image, imaging the chart with a second camera to provide a second chart image, binarizing the first chart image and second chart image to remove gray scale components, performing edge detection of the first chart image and the second chart image on the plurality of discrete geometric outlines and the at least one filled in discrete geometric outline, wherein a plurality of inner edges and a plurality of outer edges are detected, fitting at least one center to the plurality of discrete geometric outlines and the at least one filled in discrete geometric outline, fitting at least one periphery to the plurality of discrete geometric outlines and the at least one filled in discrete geometric outline, grouping the plurality of inner edges and the plurality of outer edges of the plurality of discrete geometric outlines to the at least one center based on the at least one periphery, indexing the at least one center of the plurality of discrete geometric outlines utilizing the at least one filled in discrete geometric outline as a reference based on the grouping, matching the indexed at least one center of the first chart image and the second chart image and aligning the first camera and the second camera based on the matching of the first chart image to the second chart image.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
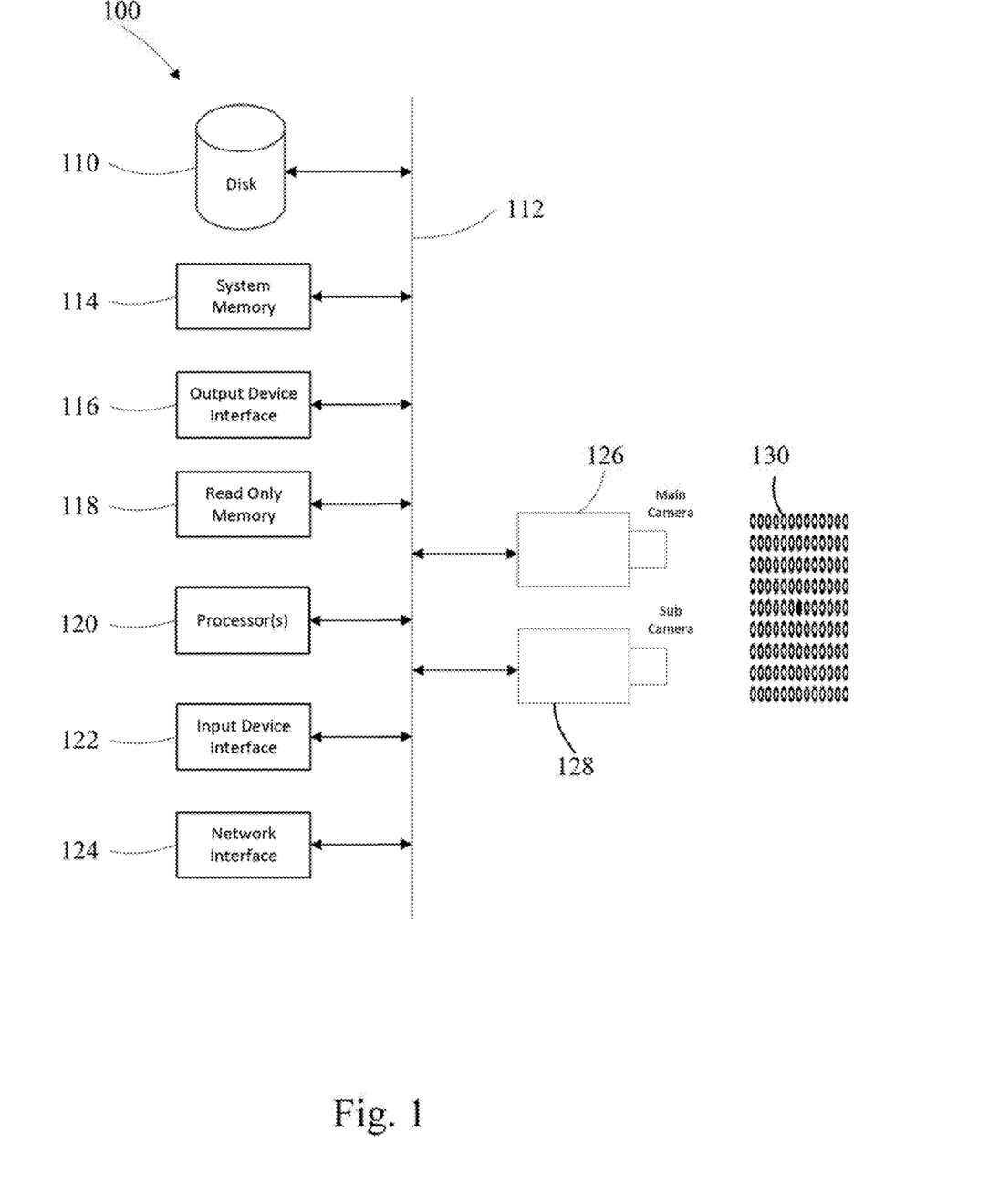
FIG. 1 is a system diagram in accordance with one embodiment of the disclosure.

FIG. 1 depicts an example electronic system for use in connection with a system having dual cameras. Electronic system 100 may be a computing device for execution of software associated with the operation of one or more portions or steps of process 500, 700 800 or 900, or components and processes provided by FIGS. 5 and 7-9. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to the auto focus camera module sensor 126 (main camera) and the fixed focus camera module 128 (sub camera) taking a photo of the chart 130.

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, auto focus camera module sensor 126 (main camera) and fixed focus camera module 128 (sub camera) taking a photo of the chart 130.

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 10 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or WiFi) or radio circuitry for connecting to a wireless access point Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

In one embodiment, two cameras are calibrated, one camera having a fixed zoom and a second camera having a variable zoom. The two cameras are calibrated so that they are aligned in the x, y, and z axis and rotation. This calibration insures that both cameras are viewing the same point in space.

The variable focus camera has the ability to focus on objects near and far, the fixed focus camera has the ability to focus on objects at a specific distance from the camera and beyond. In the fixed focus camera objects closer than the focus length are unfocused, i.e. the images are not sharply defined.

Currently, this lack of clear definition for near points makes it necessary to specify a minimum target distance and minimum chart size. This currently set distance and size minimum is in part driven by the use of a checkerboard pattern of connected squares, where the intersection points of the squares are utilized. Unfocused images of the checkerboard make repeatably locating square intersections problematic.

Figure 2:
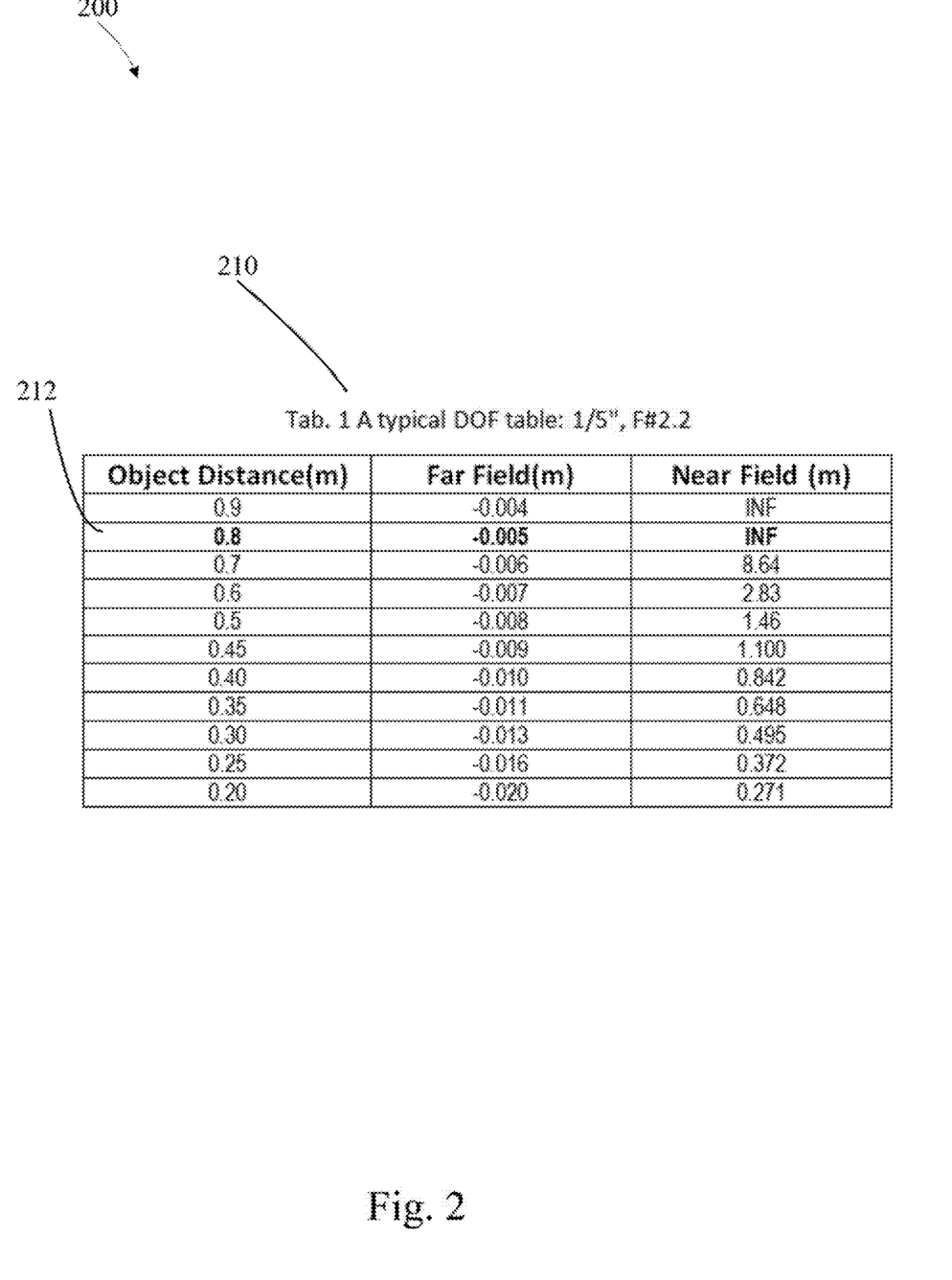
FIG. 2 is an example focus table.

FIG. 2 depicts a typical ⅕" with an F stop 2.2 lens that has a fixed focus of 80 cm to infinity. Commonly, an 80° diagonal field of view (FOV) is utilized, this FOV drives the size of the calibration chart 210 to be in excess of 100 cm×8 cm when placed at 80 cm distance 212 to take focused images. To reduce the size and still image the full field of view, the chart distance may be reduced. For example, when reducing the target distance to 20 cm, the size of chart may be less than 30 cm×25 cm. In this instance, the camera may not generate images clear enough due to its fixed focus length of 80 cm to allow proper calibration utilizing a checkerboard pattern.

Figure 3:
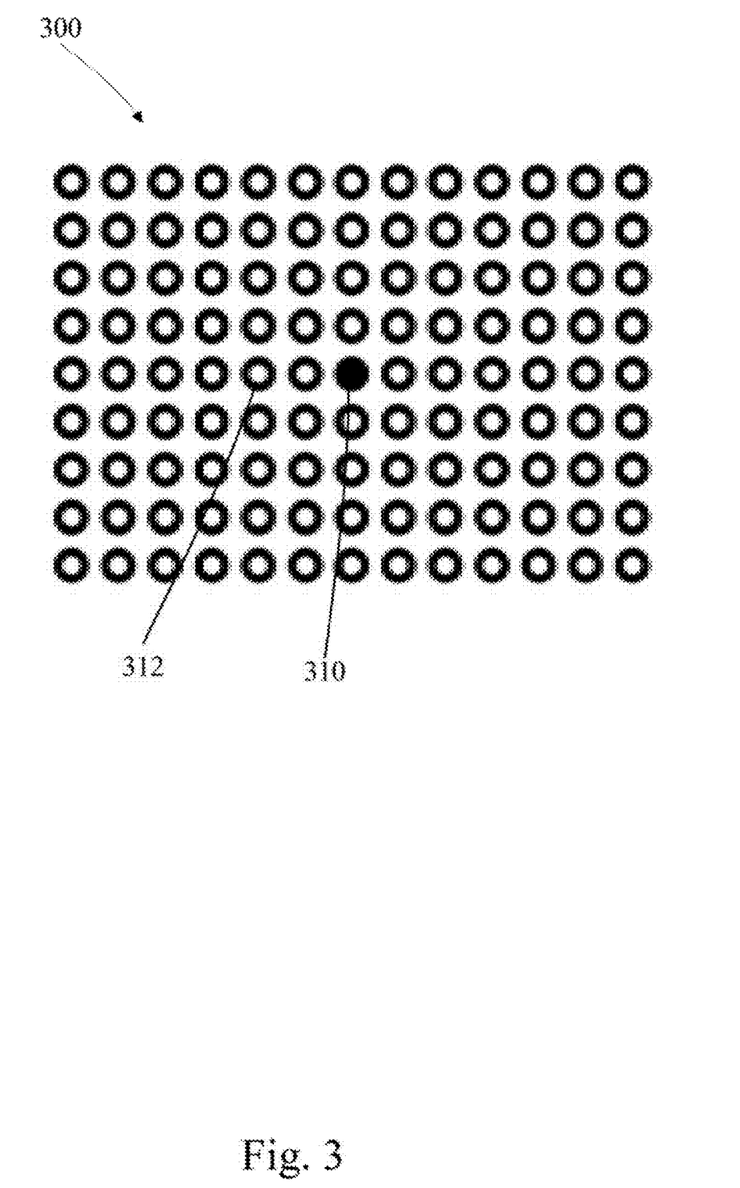
FIG. 3 is a depiction of a focus chart in accordance with one embodiment of the disclosure.

One possible solution to repeatably locating geometric artifacts is to forgo looking for intersections and instead locate discrete geometric centers or centroids. FIG. 3 depicts a chart with many small circular rings 312 and having a filled in registration disk 310. The circular rings are placed around the registration disk. The rings are arrayed in columns and rows, in a pre-defined manner, which ensures that physical coordinates are known, if the coordinates systems is defined by the chart itself. Compared with the traditional checker board chart as in FIG. 6 which needs to be clearly captured so that crossing corners may be detected and localized, the center of each ring may be calculated from an unfocused image, i.e. at a distance closer than the focal point.

Figure 4:
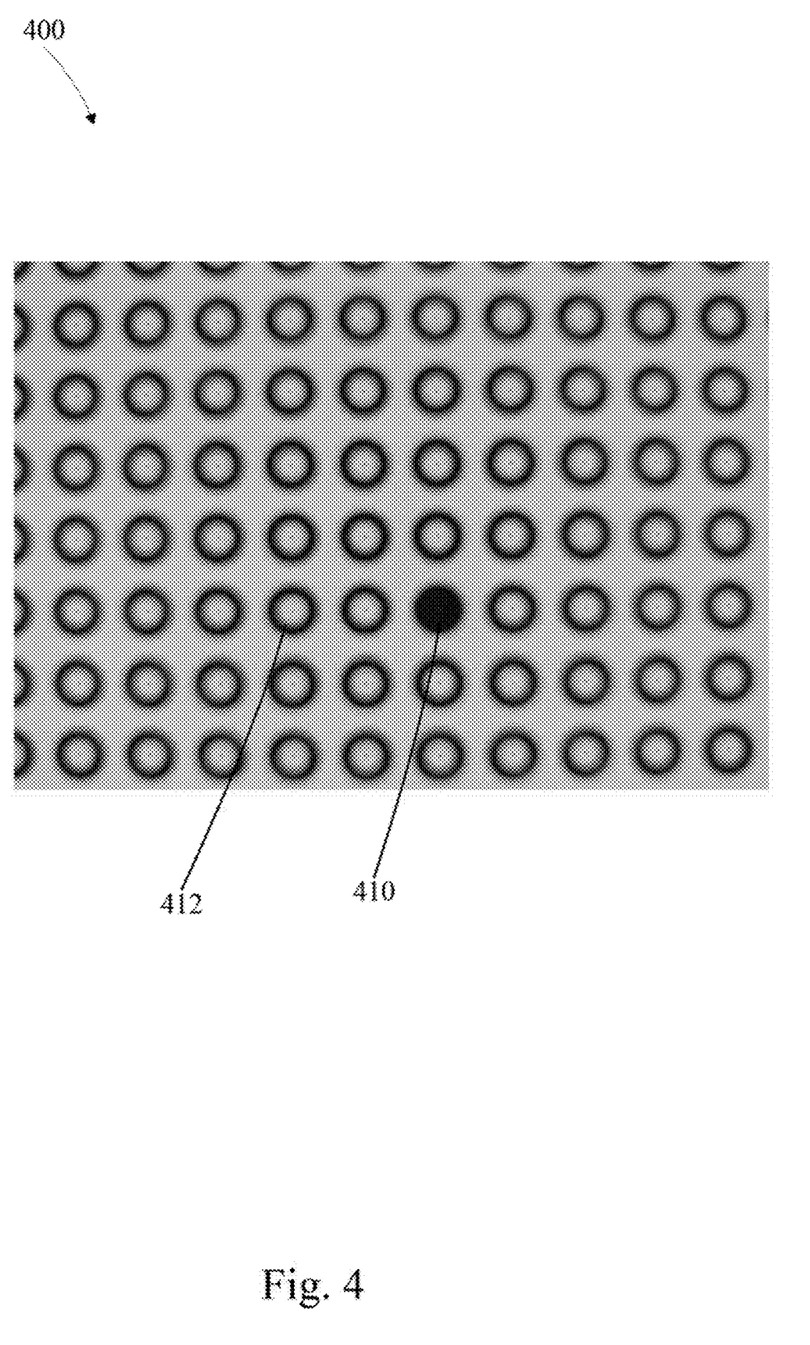
FIG. 4 is a depiction of a gray scale focus in accordance with one embodiment of the disclosure.

FIG. 4 shows a gray scale image having a disk 410 which is utilized for registration and multiple circular rings 412. Although it is possible to utilize a gray scale image, edge detection may be less problematic using a black and white image. Therefore the image may be binarized or despeckled to increase contrast.

Figure 5:
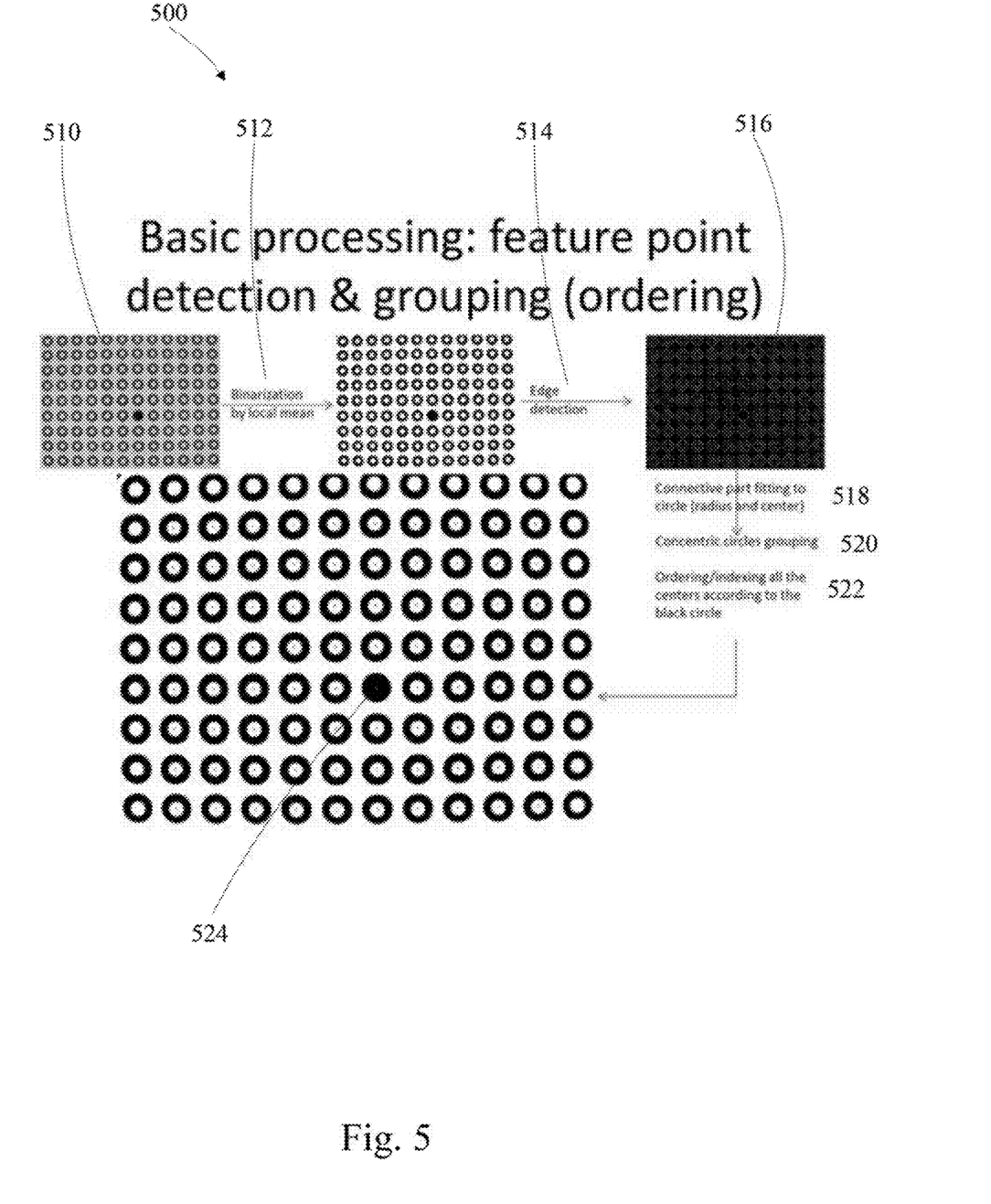
FIG. 5 is a first flow diagram in accordance with one embodiment of the disclosure.

FIG. 5 depicts a first flow chart for the method. The method to reconstruct ring centers includes adaptively binarizing 512 the ring image 510, to obtain a black and white image. Edge detection is performed 514 which indicates the inner and outer edge of the circular rings to show concentric edges 516 and locates the outer edge of the circular disk. Since it is known in this example that the geometric shapes are comprised of circular rings and a disk a connective part fitting to circles 518 is performed. The concentric circles shown by the inner and outer edges of the circular rings are grouped 520. Having grouped the concentric rings, the groupings are then ordered and indexed 522 with respect to the circular disk. The centers of the groupings are then located with respect to the center disk (as a location mark) or registration disk 524.

After these feature points are detected, the feature points in the main and second image are matched in pairs, denoted as $X_{mk}=[x_{mk},y_{mk}]^t$ and $X_{sk}=[x_{sk},y_{sk}]^t$, k=1, 2 ... N, where N is the matched feature number. These feature pairs may be used to estimate the rotation between the two cameras. A typical calibration example can be Eq1, $$[A, B, \Gamma] \mathrm{argmin}_{\alpha,\beta,\gamma} \left\{ \sum_{i=0}^{N} \left\| (X_{mi} - C_m)/f_m - \left( \begin{array}{c} R_1\left(\frac{X_{si}-C_s}{f_s}, 1\right)^t / R_3\left(\frac{X_{si}-C_s}{f_s}, 1\right)^t \\ R_2\left(\frac{X_{si}-C_s}{f_s}, 1\right)^t / R_3\left(\frac{X_{si}-C_s}{f_s}, 1\right)^t \end{array} \right) \right\|^2 \right\} \quad (Eq1)$$

where $C_m$, $C_s$ denote the center coordinates of the main and second camera; $f_m$, $f_s$ denote the focal length of the main and second camera, measured in their own pixel size; $R_1$, $R_2$, $R_3$ are the first, second, and third row of the rotation matrix R, defined by Equation 2.

$$R = R_z(\gamma)R_y(\beta)R_x(\alpha) = \begin{bmatrix} \cos\gamma & \sin\gamma & 0 \\ -\sin\gamma & \cos\gamma & 0 \\ 0 & 0 & 1 \end{bmatrix} \begin{bmatrix} \cos\beta & 0 & -\sin\beta \\ 0 & 1 & 0 \\ \sin\beta & 0 & \cos\beta \end{bmatrix} \begin{bmatrix} 1 & 0 & 0 \\ 0 & \cos\alpha & \sin\alpha \\ 0 & -\sin\alpha & \cos\alpha \end{bmatrix} \quad (Eq2)$$

Generally the optimization problem of Equation 1 may be solved by the Levenberg-Marquart algorithm.

When camera modules are calibrated, they are often installed in devices. During the installation, the characteristics of some cameras may be altered and verification may be performed utilizing a slightly rotated checker board as shown in FIG. 6.

A chart with many small ring circles may be used as the calibration chart. A smaller calibration distance may utilized, which is nearer than the focus distance of the fixed focus camera. An unfocused image may be captured, imaging circular rings with a high degree of repeatability.

A slightly rotated checker board may be utilized in the dual camera verification stage, making it possible to measure the lens focus information, such as the modulation transfer function (MTF).

Figure 6:
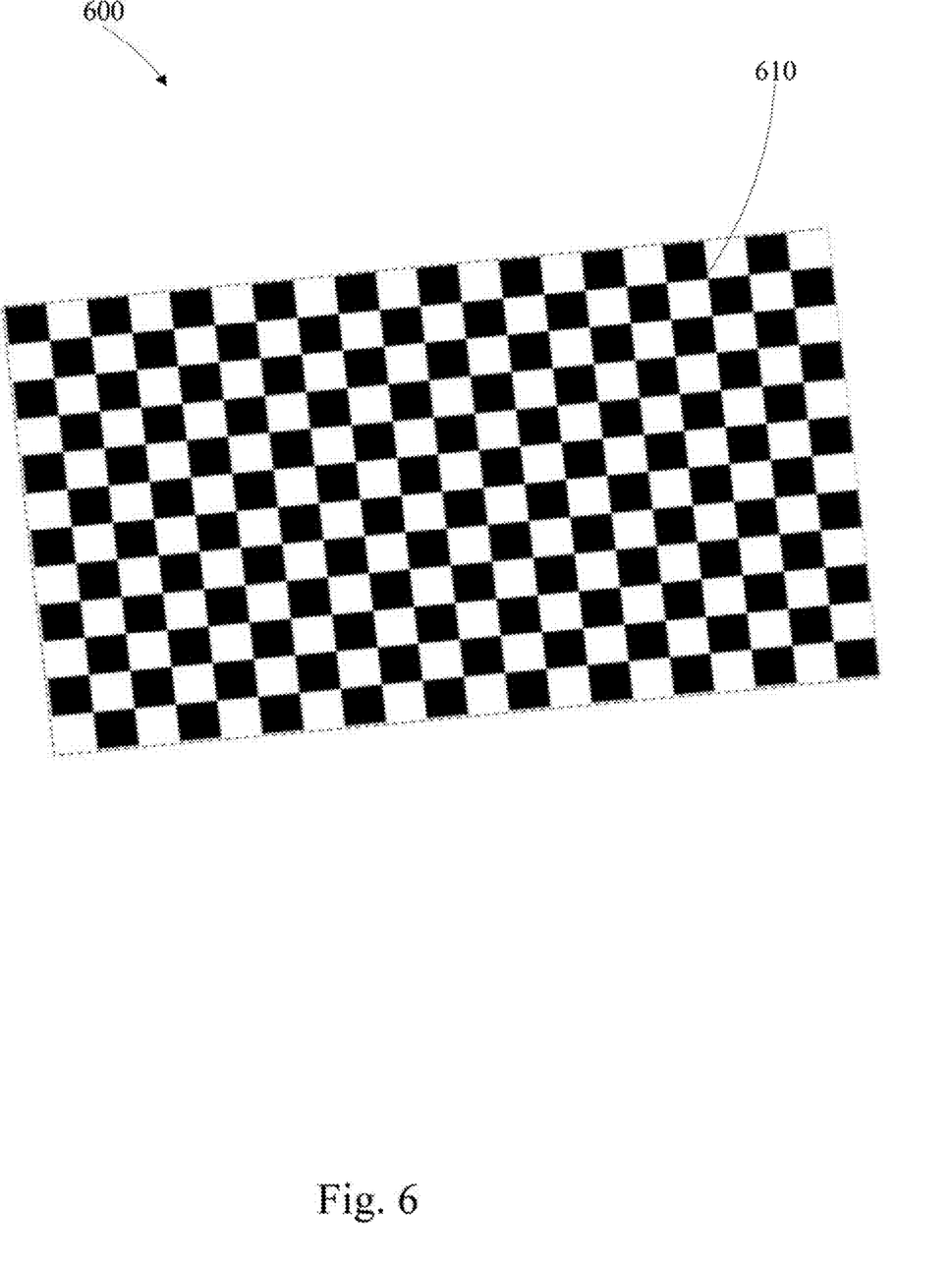
FIG. 6 is a checkerboard pattern for use in verification in accordance with one embodiment of the disclosure.

A follow-on verification chart may utilize a checker board as shown in FIG. 6. In the case of a fixed focus camera having an 80 cm focus distance, a target distance of 50 cm may provide fairly clear images. The crossing corners of the checker board 610 may be well detected in this distance, and the geometric parameters between these two cameras may be estimated again, and compared with the ones estimated by the module using the ring chart, to determine whether the calibration has been altered. This checker board may have a small angle rotating around camera Z direction (i.e., the optical axis), with purpose being to examine the modulation transfer function of the camera modules.

Figure 7:
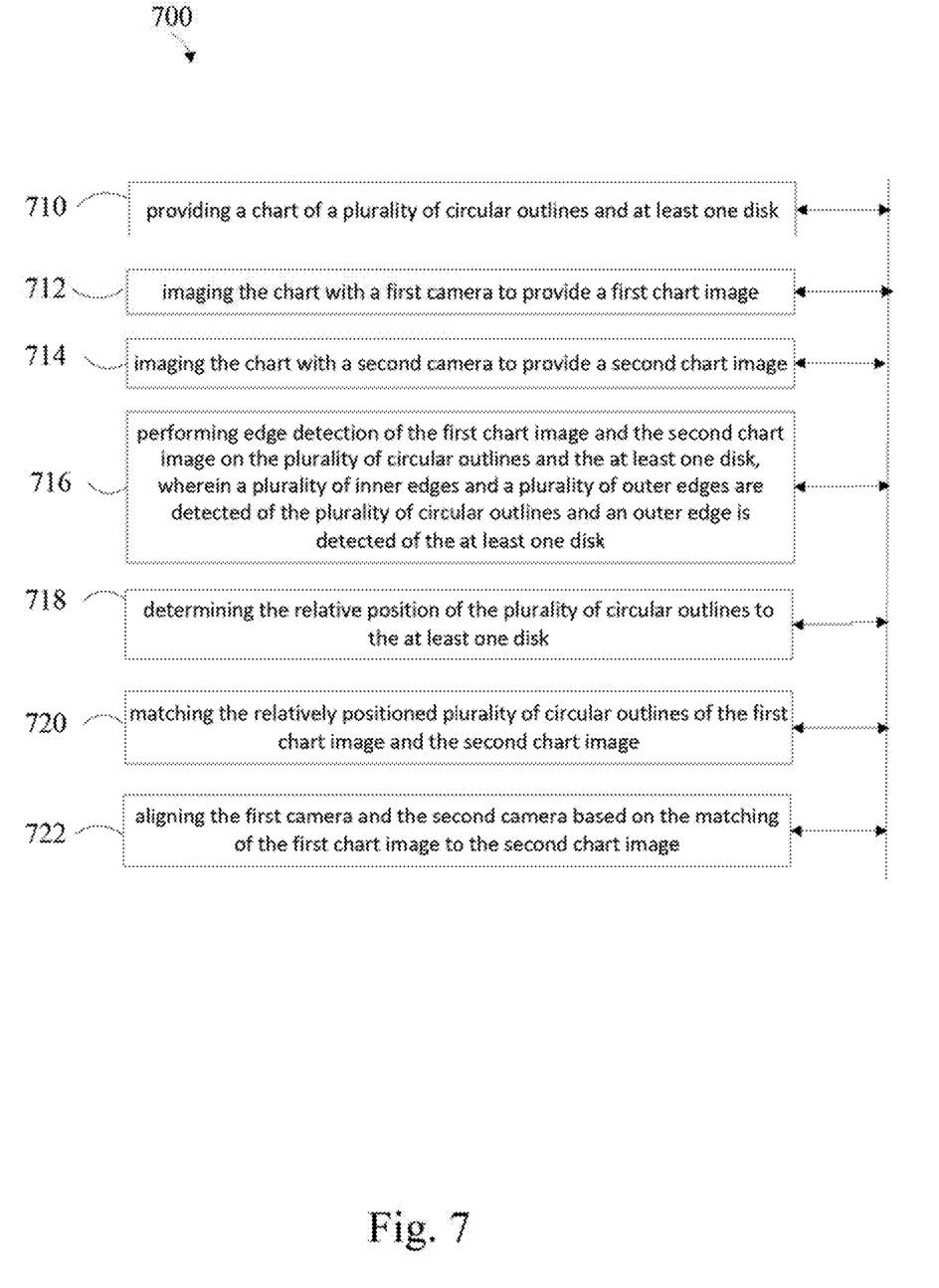
FIG. 7 is a second flow diagram in accordance with one embodiment of the disclosure.

FIG. 7 depicts a second embodiment of a method of calibration of a dual camera system that includes, providing 710 a chart having multiple circular rings and a filled in disk which will be used for registration, imaging 712 the chart with a first camera to provide a first chart image and imaging 714 the chart with a second camera to provide a second chart image. The method also includes performing 716 edge detection of the first chart image and the second chart image on the circular rings and the disk, where the inner edges and outer edges of the circular rings are detected and an outer edge is detected of the disk. The method further includes determining 718 the relative position of the circular rings to the disk, matching 720 the relative positions of the circular rings of the first and second chart image and aligning 722 the first and second cameras based on the matching of the first chart image to the second chart image.

Figure 8:
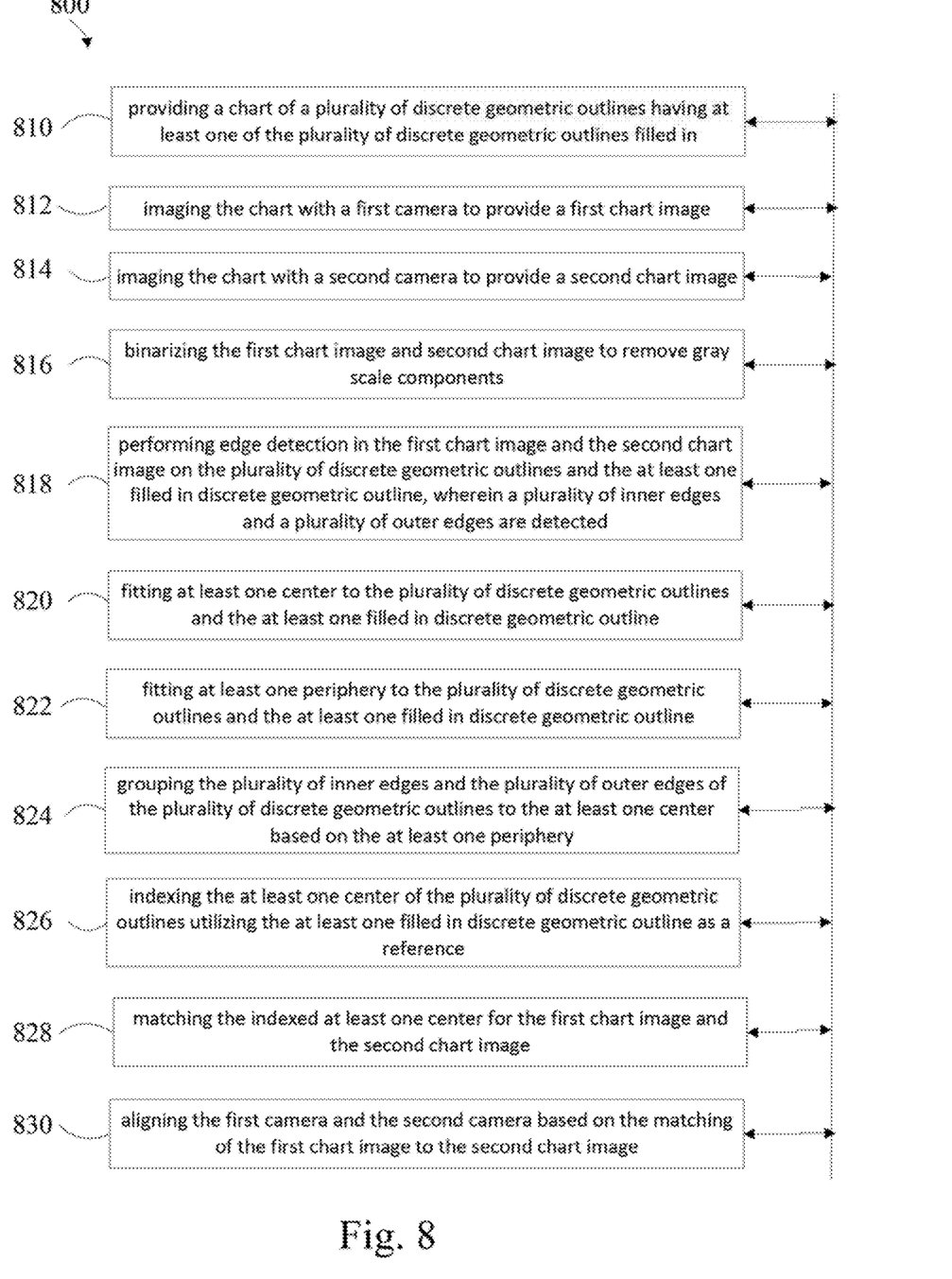
FIG. 8 is a third flow diagram in accordance with one embodiment of the disclosure.

FIG. 8 depicts a third embodiment of a method of calibration of a dual camera system, that includes, providing 810 a chart having multiple circular rings and a filled in disk which is to be used as a registration disk, imaging 812 the chart with a first camera to provide a first chart image and imaging 814 the chart with a second camera to provide a second chart image. The method also includes binarizing 816 the first and second chart images to remove gray scale components and, performing 818 edge detection of the first and second chart images of the circular rings and the disk. The inner edges and outer edges of the circular rings and an outer edge of the disk are detected. The method further includes fitting 820 centers to the circular rings and the disk, fitting 822 radii to the circular rings and the disk and grouping 824 the inner edges and the outer edges of the circular rings to the centers based on the radii. The method also includes indexing 826 the centers of the circular rings utilizing the disk as a reference based on the grouping, matching 828 the indexed centers of the first and second chart images and aligning 830 the first camera and the second camera based on the matching of the first chart image to the second chart image.

Figure 9:
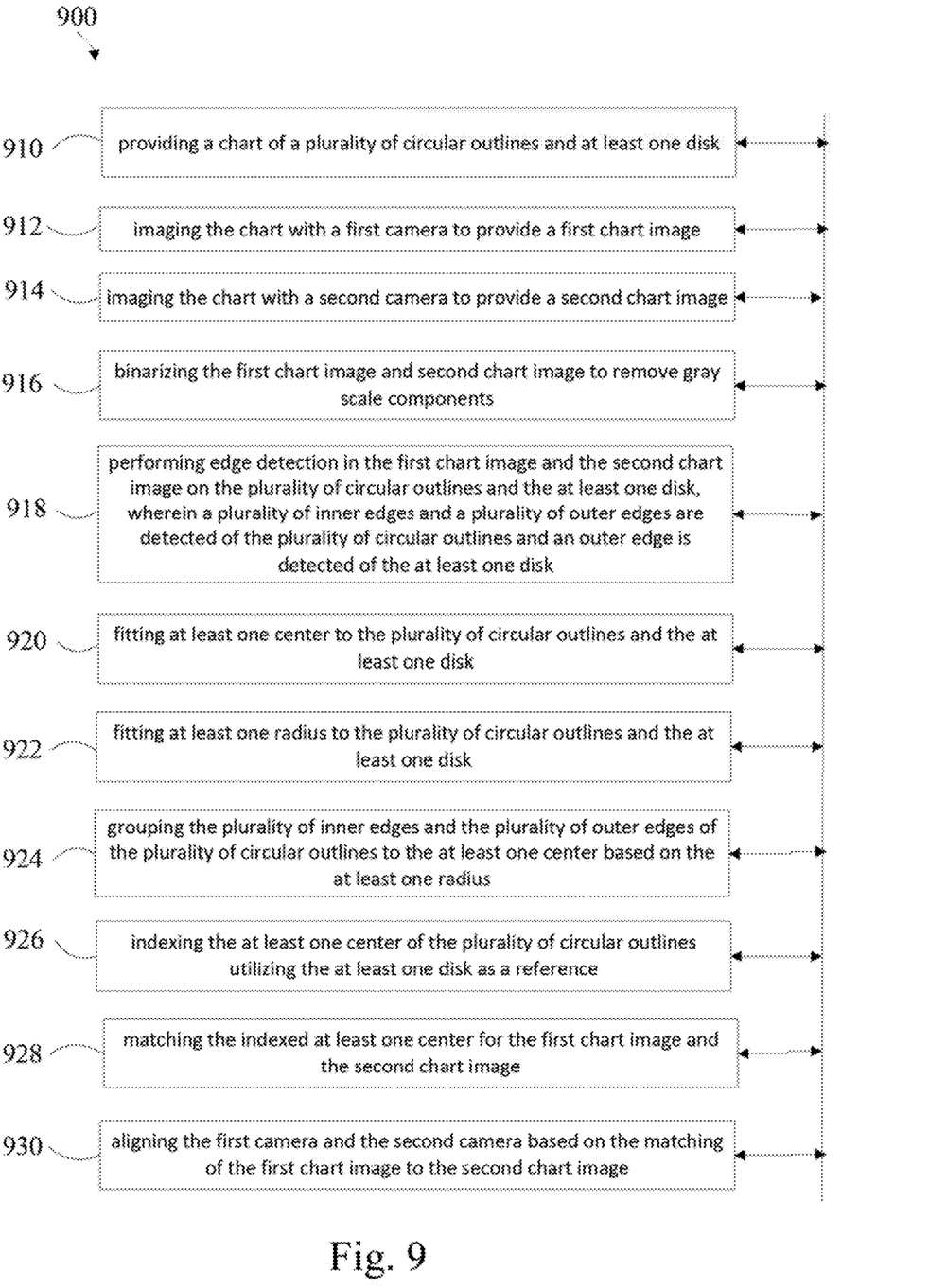
FIG. 9 is a fourth flow diagram in accordance with one embodiment of the disclosure.

FIG. 9 depicts a fourth embodiment of a method of calibration of a dual camera system, including, providing 910 a chart having multiple discrete geometric outlines and a discrete geometric outline that is filled in, imaging 912 the chart with a first camera to provide a first chart image and imaging 914 the chart with a second camera to provide a second chart image. The method further includes binarizing 916 the first chart image and second chart image to remove gray scale components and performing 918 edge detection of the first chart image and the second chart image on the discrete geometric outlines and the filled in discrete geometric outline. The inner edges and outer edges of the outlines and an outer edge of the filled in outline are detected. The method also includes fitting 920 centers to the multiple discrete geometric outlines and the filled in discrete geometric outline and fitting 922 peripheries to the discrete geometric outlines and the filled in discrete geometric outline. The method also provides grouping 924 the inner edges and the outer edges of the discrete geometric outlines to individual centers based on the peripheries and indexing 926 the centers of the multiple discrete geometric outlines utilizing the filled in discrete geometric outline as a reference based on the grouping. The method further includes matching 928 the indexed centers of the first chart image and the second chart image and aligning 930 the first camera and the second camera based on the matching of the first chart image to the second chart image.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to" "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of calibration of a dual camera system, comprising:
    providing a chart of a plurality of discrete geometric outlines having at least one of the plurality of discrete geometric outlines filled in;
    imaging the chart with a first camera to provide a first chart image;
    imaging the chart with a second camera to provide a second chart image;
    binarizing the first chart image and second chart image to remove gray scale components;
    performing edge detection of the first chart image and the second chart image on the plurality of discrete geometric outlines and the at least one filled in discrete geometric outline,
    wherein a plurality of inner edges and a plurality of outer edges are detected;
    fitting at least one center to the plurality of discrete geometric outlines and the at least one filled in discrete geometric outline;
    fitting at least one periphery to the plurality of discrete geometric outlines and the at least one filled in discrete geometric outline;
    grouping the plurality of inner edges and the plurality of outer edges of the plurality of discrete geometric outlines to the at least one center based on the at least one periphery;
    indexing the at least one center of the plurality of discrete geometric outlines utilizing the at least one filled in discrete geometric outline as a reference based on the grouping;
    matching the indexed at least one center of the first chart image and the second chart image; and
    aligning the first camera and the second camera based on the matching of the first chart image to the second chart image.

2. The method of claim 1 wherein at least one of the first camera and the second camera is a fixed focus camera.

3. The method of claim 1 wherein the plurality of discrete geometric outlines are closed.

4. The method of claim 1 wherein the plurality of discrete geometric outlines are multi-sided closed polygons.

5. The method of claim 1 wherein the plurality of discrete geometric outlines are plane.

6. The method of claim 1 further comprising measuring at least one modulation transfer function from at least one of the first camera and the second camera.

7. The method of claim 1 wherein at least one of the first camera and the second camera are not focused on the chart.

8. The method of claim 1 further comprising validating the alignment of the first camera to the second camera utilizing a checkerboard chart.

* * * * *